US011292462B1

(12) United States Patent
Karasev et al.

(10) Patent No.: US 11,292,462 B1
(45) Date of Patent: Apr. 5, 2022

(54) OBJECT TRAJECTORY FROM WHEEL DIRECTION

(71) Applicant: Zoox, Inc., Foster City, CA (US)

(72) Inventors: Vasiliy Karasev, San Francisco, CA (US); James William Vaisey Philbin, Palo Alto, CA (US); Sarah Tariq, Palo Alto, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 385 days.

(21) Appl. No.: 16/412,189

(22) Filed: May 14, 2019

(51) Int. Cl.
*B60W 30/095* (2012.01)
*B60W 30/09* (2012.01)
*G05D 1/02* (2020.01)
*G05D 1/00* (2006.01)
*G06K 9/00* (2006.01)
*G06N 20/00* (2019.01)

(52) U.S. Cl.
CPC ........ *B60W 30/0956* (2013.01); *B60W 30/09* (2013.01); *G05D 1/0088* (2013.01); *G05D 1/0221* (2013.01); *G06K 9/00825* (2013.01); *G06N 20/00* (2019.01); *G05D 2201/0213* (2013.01)

(58) Field of Classification Search
CPC .............. B60W 30/0956; B60W 30/09; G05D 1/0221; G05D 1/0088; G05D 2201/0213; G06K 9/00825; G06N 20/00
See application file for complete search history.

(56) References Cited

U.S. PATENT DOCUMENTS

| 10,706,563 | B2 * | 7/2020 | Kushleyev | ............. G06T 7/248 |
| 2019/0049987 | A1 * | 2/2019 | Djuric | ................. G06K 9/6288 |
| 2020/0272160 | A1 * | 8/2020 | Djuric | ................. G01S 13/723 |

* cited by examiner

*Primary Examiner* — Brian P Sweeney
(74) *Attorney, Agent, or Firm* — Lee & Hayes, P.C.

(57) ABSTRACT

A trajectory estimate of a wheeled vehicle can be determined based at least in part on determining a wheel angle associated with the vehicle. In some examples, at least a portion of the image associated with the wheeled vehicle may be input into a machine-learned model that is trained to classify and/or regress wheel directions of wheeled vehicles. The machine-learned model may output a predicted wheel direction. The wheel direction and/or additional or historical sensor data may be used to estimate a trajectory of the wheeled vehicle. The predicted trajectory of the object can then be used to generate and refine an autonomous vehicle's trajectory as the autonomous vehicle proceeds through the environment.

20 Claims, 6 Drawing Sheets

OBJECT TRAJECTORY FROM WHEEL DIRECTION

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects. A variety of sensors may be used to collect information about objects in the surrounding environment, which may be used by the autonomous vehicle to make decisions on how to traverse the environment. Accurately predicting trajectories of objects in the environment may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
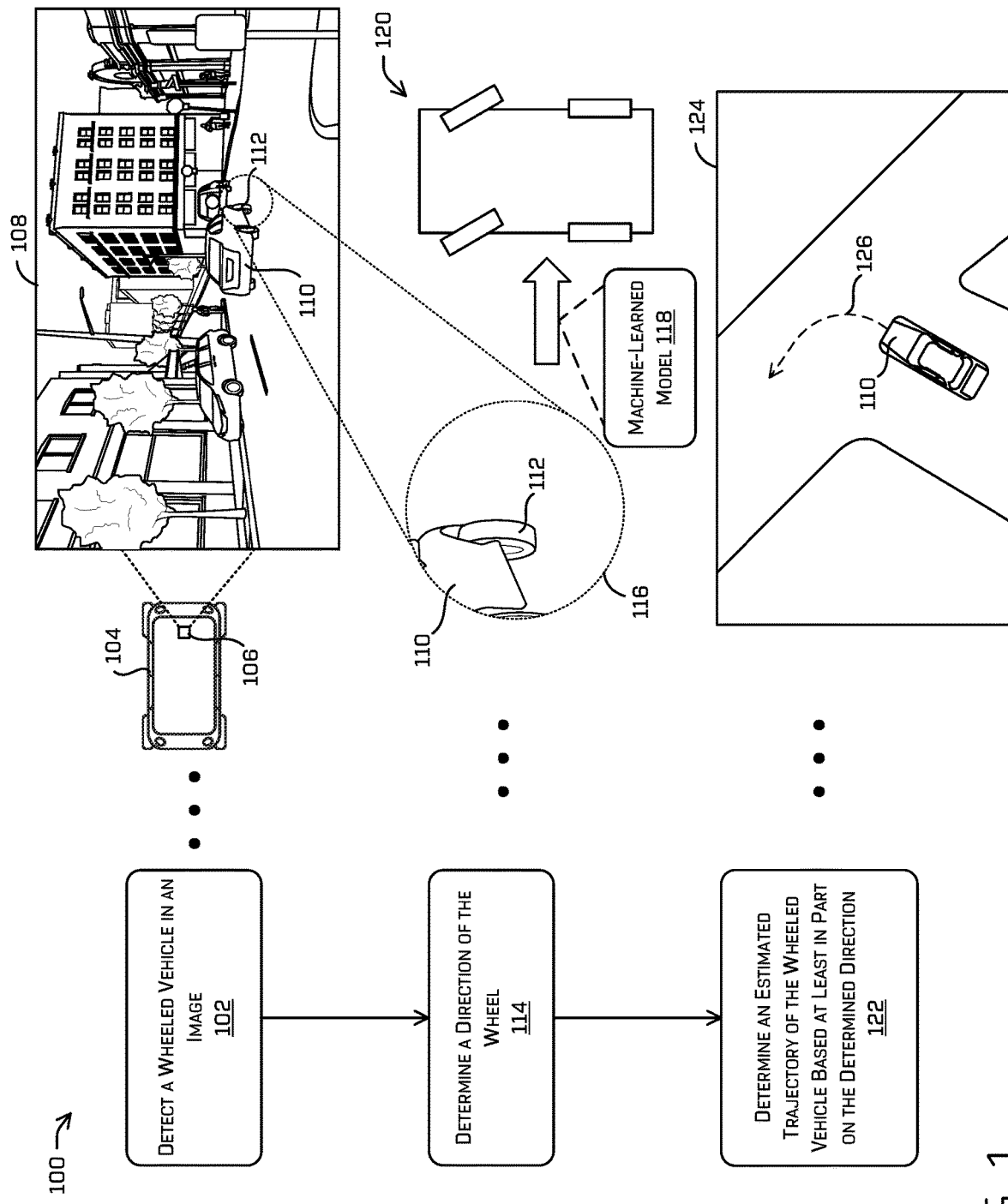
FIG. 1 is a pictorial flow diagram of detecting a wheeled vehicle in an image, determining a direction of the wheel, and determining an estimated trajectory of the wheeled vehicle based at least in part on the direction classification, in accordance with examples of the disclosure.

This disclosure relates to determining a trajectory estimate of a wheeled vehicle based on an image depicting the wheeled vehicle. In some examples, a vehicle such as an autonomous vehicle may utilize a variety of sensor modalities and algorithms to predict trajectories of objects in an environment surrounding the autonomous vehicle. Predicted trajectories of objects can then be used to generate and refine the autonomous vehicle's trajectory as the autonomous vehicle proceeds through the environment. Some examples of generating and/or refining an autonomous vehicle's trajectory may include determining a speed to proceed through the environment, determining when and/or how fast to stop, determining a lane for the autonomous vehicle to use to proceed through the environment, and so forth.

In many cases, an autonomous vehicle may use techniques such as object tracking over time to make predictions about how the object will proceed in the future. In some instances, however, observing an object, such as a wheeled vehicle, over time may not provide sufficient information as to how the wheeled vehicle will proceed in the future. For example, consider a wheeled vehicle that is stopped in a driveway and is attempting to reenter traffic. Because the wheeled vehicle is stopped or moving slowly, an approaching autonomous vehicle may only have past observations of the wheeled vehicle being stopped without other information regarding the wheeled vehicle's trajectory, and thus may not be able to generate an accurate prediction of a direction that the wheeled vehicle will proceed into traffic. In some cases, a planning component of the autonomous vehicle may be more conservative in making decisions while approaching the wheeled vehicle because of the uncertainty on how the wheeled vehicle will proceed. In some examples, the described techniques may determine a trajectory estimate of another vehicle in the environment based on a detected direction of the wheels of the other vehicle in an image. This trajectory estimate may be used by a planning component of an autonomous vehicle to plan a path through the environment.

Sensor data captured by the autonomous vehicle can include lidar data, radar data, image data, time of flight data, sonar data, and the like. In some cases, the sensor data can be provided to a perception system configured to determine a type of an object (e.g., vehicle, pedestrian, bicycle, motorcycle, animal, parked car, tree, building, and the like) in the environment.

For instance, the sensor data may be captured by the autonomous vehicle as the autonomous vehicle traverses an environment. In some examples, the autonomous vehicle may include one or more cameras configured to capture images (e.g., individual images and/or video) of the surrounding environment. In some examples, a wheeled vehicle (e.g., automobile, motorcycle, bicycle, etc.) may be detected in an image captured by the camera. An object direction component of the autonomous vehicle may determine whether one or more wheels of the wheeled vehicle are depicted in the image. If so, the object direction component may determine whether the one or more wheels depicted in the image control the direction of travel of the wheeled vehicle. For instance, many wheeled vehicles are steered by the front wheel(s) of the wheeled vehicle, although examples are contemplated in which rear wheels control steering of a wheeled vehicle, either additionally or alternatively.

The object direction component may then classify and/or regress a direction of the wheel of the wheeled vehicle. In some examples, the object direction component may input the image depicting the vehicle into a machine-learned model that is trained to classify and/or regress wheel directions of wheeled vehicles. In some models, such input may input a cropped portion of the image corresponding to the vehicle. Additionally, or alternatively, a cropped portion of the image corresponding to a wheel of the vehicle may be input into such a machine-learned model. For instance, the machine-learned model may be trained to classify the direction of wheels of wheeled vehicles based on three different possible directions (e.g., right, straight, left), five different possible directions (e.g., right, slight right, straight, slight left, left), or any number of direction classifications. Even further, the machine-learned model may be trained to classify the wheel direction on a degree-level (e.g., ten degrees, five degrees, one degree, etc.) to more accurately predict a direction of travel of the wheeled vehicle. In those examples in which the model is trained to regress, an output of the model may be a predicted angle of the wheel.

The object direction component may receive an indication of a wheel direction associated with the wheel of the wheeled vehicle from the machine-learned model. In some examples, the direction associated with the wheel may fall into one of the classifications upon which the machine-learned model is trained. For instance, the machine-learned model may be trained on a finite number (e.g., 3, 5, etc.) of wheel directions/positions. In an example in which the machine-learned model is trained based on three possible wheel directions, the model may return one of the three possible wheel directions. In another example, the machine-learned model may be trained to classify wheel direction in angular increments (e.g., ten-degree increments), and thus returns a degree estimate and/or degree range, such as 45 degrees, 70-80 degrees, and so forth. However, other approaches to classifying wheel angle are also possible. In those models which are trained to regress, a measured angle may be provided.

In some examples, the object direction component may determine an estimated trajectory of the wheeled vehicle based on the direction classification and/or wheel angle received from the machine-learned model. The object direction component may combine the direction classification/angle for the wheel of the wheeled vehicle with other information regarding the wheeled vehicle (e.g., a past trajectory of the wheeled vehicle), information about the environment (e.g., map data, trajectories of other objects, etc.) and so on to determine the estimated trajectory of the wheeled vehicle. Continuing with the above example of the wheeled vehicle stopped in the driveway and attempting to reenter traffic, the object direction component may use map data and a direction classification of the wheel(s) of the wheeled vehicle to determine a direction and a lane that the wheeled vehicle is likely to enter upon exiting the driveway. In another example, the object direction component may use information about a wheeled vehicle's past trajectory relating to the wheeled vehicle traveling in reverse (e.g., backwards) to generate an estimated trajectory of how the wheeled vehicle will continue through the environment.

The techniques discussed herein can improve a functioning of a computing device in a number of ways. As mentioned above, the object direction component may use as few as a single image or single video frame to make reliable trajectory estimates of wheeled vehicles in the environment surrounding a vehicle. Consequently, significantly less processing resources are used in comparison to conventional techniques that require complex image analysis algorithms applied to sequences of multiple images to predict a trajectory of an object. Further, conventional techniques that estimate velocity often require multiple observations (e.g., multiple images or video frames), and thus these conventional techniques have higher latency than the techniques described herein. Since the trajectory estimation can be made from a single image, the object direction component may be able to determine estimated trajectories more quickly and/or for more objects in the environment than would be possible if more images, and/or other sensor data, was required. In some cases, the described techniques are more accurate than other trajectory estimation mechanisms. For example, as noted above, techniques that rely upon data regarding a past trajectory of a wheeled vehicle may not accurately reflect what the wheeled vehicle will do next, such as in the case of stopped or slow moving wheeled vehicles that may imminently initiate movement. By controlling the vehicle based in part on estimated trajectories of objects determined from classified wheel directions, the safety of the vehicle can be improved by predicting object trajectories faster and earlier, thus allowing the vehicle to make its own trajectory decisions earlier. Additionally, as just described, controlling the vehicle based in part on estimated trajectories of objects determined from classified wheel directions can reduce processing resources, with as few as a single image being evaluated by the processing resources at one time during the trajectory estimation. Further, techniques for controlling the vehicle based in part on estimated trajectories of objects determined from classified wheel directions can increase a confidence that the vehicle can avoid collisions with oncoming traffic by determining the velocities earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 of detecting a wheeled vehicle in an image, determining a direction of the wheel, and determining an estimated trajectory of the wheeled vehicle based at least in part on the direction classification, in accordance with examples of the disclosure.

An operation 102 includes detecting a wheeled vehicle in an image. For example, a vehicle 104 may include a camera 106 which may be used to capture images and/or video of an environment surrounding the vehicle 104. In this example, the camera 106 has captured an image 108 of the environment, which depicts a wheeled vehicle 110. The vehicle 104 may detect the wheeled vehicle 110 in the image 108. The wheeled vehicle 110 may be detected using any suitable object detection technique, such as a machine learning approach (e.g., scale-invariant feature transform (SIFT), histogram of oriented gradients (HOG), etc.) followed by a support vector machine (SVM) to classify the object, or a deep learning approach based on a convolutional neural network (CNN), to name a few examples. The vehicle 104 may also determine that a wheel 112 is one that is used to control steering of the wheeled vehicle 110, e.g., a front wheel of the wheeled vehicle 110, such as by using one of the described object detection techniques.

An operation 114 includes determining a direction of the wheel. In some examples, determining the direction of the wheel may include inputting the image 108 depicting the wheeled vehicle 110 to a machine-learned model trained to classify and/or regress wheel directions of wheeled vehicles. A machine-learned model trained to classify wheel directions may in some cases be a supervised model, in which the model is trained using labeled training examples to generate an inferred function to map new, unlabeled examples. Alternatively or additionally, the machine-learned model trained to classify wheel directions may be an unsupervised model, which may identify commonalities in an input data set and may react based on the presence or absence of such commonalities in each new piece of data. In those examples in which the model is trained to regress a direction, output of such a model may comprise an estimated angle of the selected wheel (e.g., wheel 112). In some examples, a cropped portion of the image corresponding to the wheeled vehicle 110 and/or the wheel 112 may be input into such a model. Additional details regarding types of machine-learned models and training of a model to classify wheel directions of wheeled vehicles may be found in the discussion of FIG. 5.

To illustrate, an expanded view 116 depicts a portion of the image 108 and includes the wheel 112 of the wheeled vehicle 110. A machine-learned model 118 may determine the wheel direction of the wheel 112 based on classifying the wheel 112 as belonging to a category corresponding to a direction of travel of the wheeled vehicle 110 and/or regressing the wheel angle. Any suitable number of classification categories may be used by the machine-learned model 118 to classify wheel directions, such as three different possible directions (e.g., right, straight, left), five different possible directions (e.g., right, slight right, straight, slight left, left), any range of degrees of a 360-degree circle, and so forth. When the image 108 (or a portion thereof, e.g., a crop of the image 108 surrounding one or more of the wheeled vehicle 110 or the wheel 112) is input into the machine-learned model 118 trained to determine wheel directions of wheeled vehicles, the machine-learned model 118 may output data indicative of a direction that the wheel 112 is turned, as indicated by the example 120. The machine-learned model 118 may be configured to receive a variety of image formats for use in classifying wheel directions of wheeled vehicles, such as raw sensor data, unedited images, an image cropped to depict the wheel 112, an image cropped to depict the wheeled vehicle 110, an image cropped to a predetermined size surrounding the wheel 112 (e.g., a predetermined number of pixels), an image cropped to depict at least two wheels of the wheeled vehicle, and so forth. In this case, the machine-learned model 118 may output a classification indicating that the wheel 112 is turned left (e.g., a discretized value, a bin value, etc.), as indicated by the example 120.

An operation 122 includes determining an estimated trajectory of the wheeled vehicle based at least in part on the determined direction. In some examples, the vehicle 104 may leverage other vehicle systems, along with the direction determination, to estimate a trajectory of the wheeled vehicle 110. For instance, the vehicle 104 may determine, from previous images of the wheeled vehicle 110, that the wheeled vehicle is moving in a forward (e.g., not "reverse") direction. The vehicle 104 may also utilize lidar data, radar data, time of flight (TOF) data, and/or previous images of the wheeled vehicle 110 to determine a speed of the wheeled vehicle 110. Further, the vehicle 104 may use a map 124 to estimate a trajectory 126 that the wheeled vehicle 110 is likely to follow, based on the classified direction of the wheel 112. For example, the vehicle 104 can predict that the wheeled vehicle 110 is making a left turn based on a classification of the wheel 112 turning left, the wheeled vehicle 110 traveling in a forward direction, and/or the map 124 indicating a left-hand turn at the intersection occupied by the wheeled vehicle 110.

In some examples, the estimated trajectory of the wheeled vehicle may be used in an object tracker of the vehicle 104 (e.g., a 3D tracker) to determine yaw rate estimates associated with objects such as the wheeled vehicle 110. For instance, steering angle constrains of some wheeled vehicles may be used to determine a range of wheel directions, and an indication of a wheel direction within the range may in turn may be associated with a yaw rate of a wheeled vehicle for making trajectory predictions. In one specific example, if a steering angle of a wheeled vehicle is zero, then the yaw rate may also be zero; however, a nonzero steering angle may imply a nonzero yaw rate if a speed of a wheeled vehicle is greater than zero. Therefore, an indication of a wheel direction may be leveraged to improve yaw rate predictions of wheeled vehicles. In any example described herein, such estimated yaw rates of the detected vehicle may be constrained based on the vehicle speed and steering angle.

Figure 2:
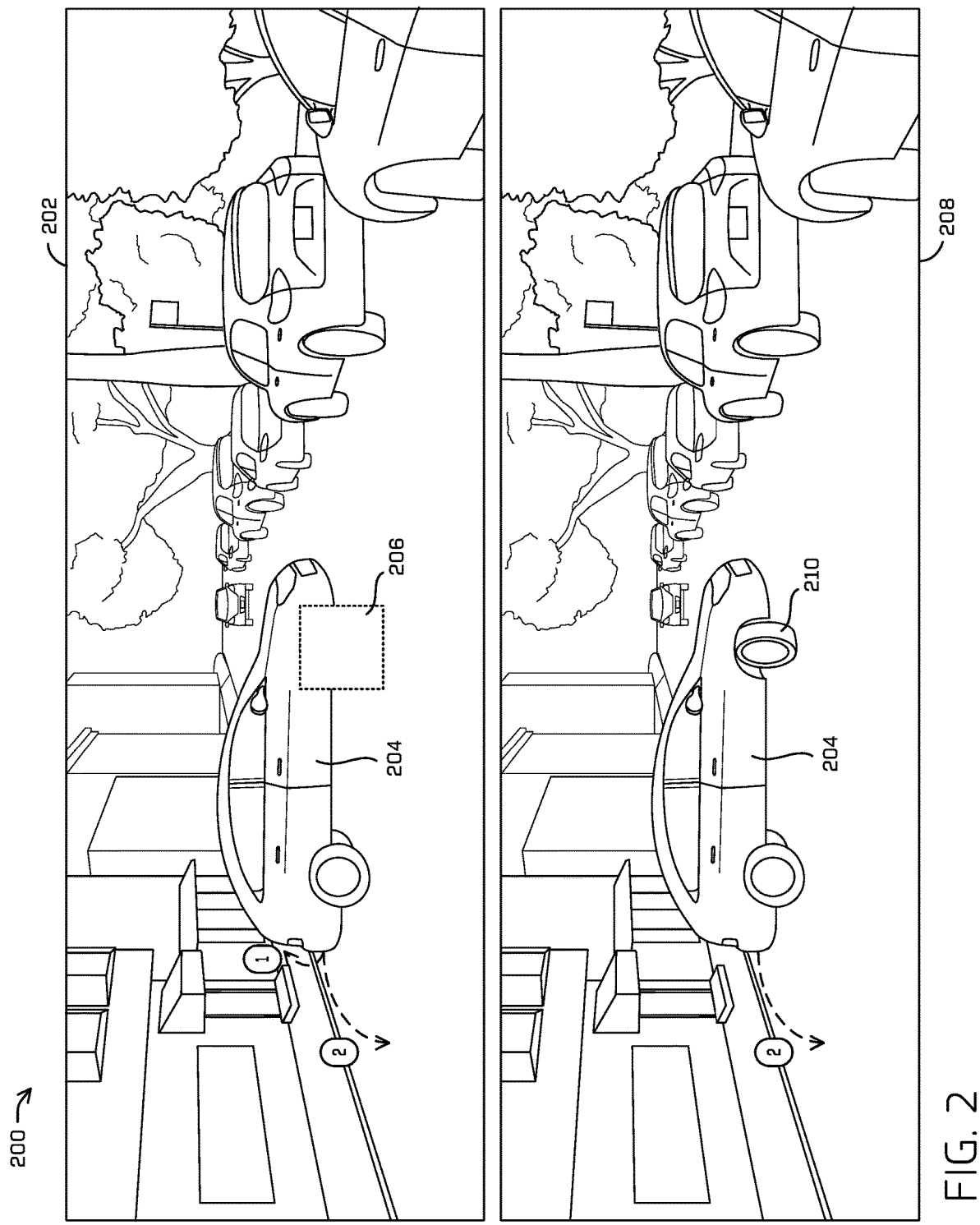
FIG. 2 is an illustration of two instances of an image which may be used to determine a trajectory of a wheeled vehicle, in accordance with examples of the disclosure.

FIG. 2 is an illustration of two instances of an image 200 which may be used to determine a trajectory of a wheeled vehicle, in accordance with examples of the disclosure. According to some examples, the image 200 may be captured by a vehicle (e.g., an autonomous vehicle) traversing an environment.

A first instance 202 of the image 200 depicts a wheeled vehicle 204, which may be generally perpendicular to the direction of travel on a roadway of the environment at the time that the image 200 is captured. A perception system may determine that the wheeled vehicle 204 is moving backward (e.g., in reverse), based on lidar data, TOF data, previous images of the wheeled vehicle 204, or other techniques of determining object motion. However, without knowing a direction that the wheels of the wheeled vehicle 204 used for steering are oriented, the perception system may not be able to determine which one of a number of possible future trajectories are most likely for the wheeled vehicle 204 to follow. To illustrate, a patch 206 has covered the wheels of the wheeled vehicle 204 used to control steering of the wheeled vehicle 204. Without knowing how the wheel covered by the patch 206 is oriented, the perception system may not be able to confidently predict between a first trajectory (indicated by "1") or a second trajectory (indicated by "2") that the wheeled vehicle 204 is likely to follow.

A second instance 208 of the image 200 depicts the wheeled vehicle 204, this time without the patch 206 covering a front wheel 210 of the wheeled vehicle 204 which in this example is used to control steering of the wheeled vehicle 204. Using the described techniques, a machine-learned model may be used to determine a direction of the front wheel 210 of the wheeled vehicle 204 depicted in the image 200. For instance, the machine-learned model may return a classification associated with the front wheel 210 that the front wheel 210 is turned to the right. The perception system may use this information to estimate a trajectory of the wheeled vehicle 204. Using the information that the wheeled vehicle 204 is traveling backwards, along with the classification that the front wheel 210 is turned to the right, the perception system may select the second trajectory ("2") as the likely trajectory that the wheeled vehicle 204 will follow.

Figure 3:
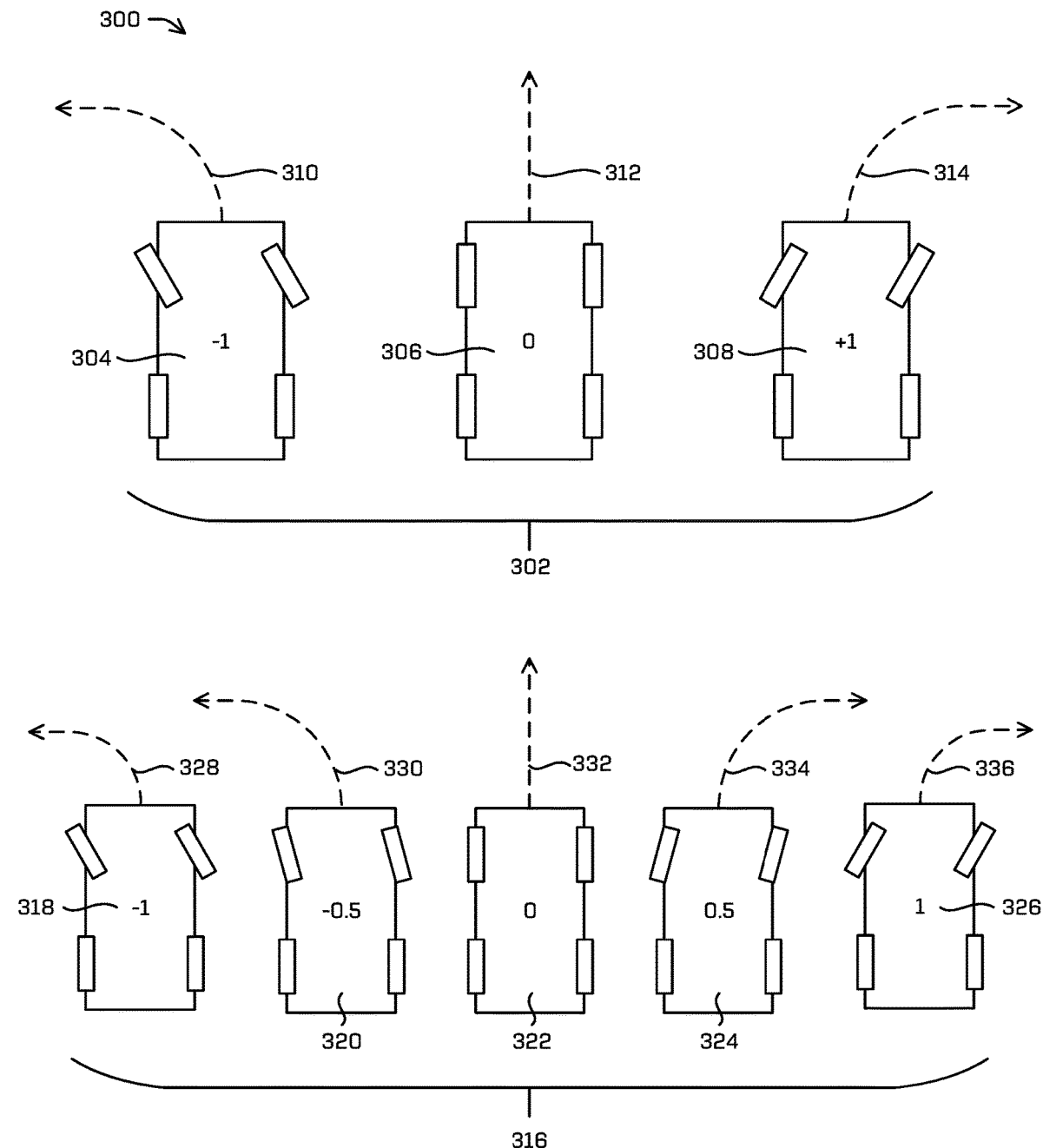
FIG. 3 is an illustration of various classifications that may be utilized to determine trajectories of wheeled vehicles, in accordance with examples of the disclosure.

FIG. 3 is an illustration of various classifications 300 that may be utilized to determine different trajectories of wheeled vehicles, in accordance with examples of the disclosure.

A first classification group 302 includes three bins corresponding to a left wheel direction 304, a straight wheel direction 306, and a right wheel direction 308. In some examples, the three wheel directions 304, 306, and 308 may correspond to discretized values ranging from −1 to 1, where the left wheel direction 304 corresponds to −1, the straight wheel direction 306 corresponds to 0, and the right wheel direction 308 corresponds to 1. The first classification group 302 may be used to train a machine-learned model to classify wheel directions into the three bin directions 304, 306, and 308. For instance, in a supervised machine-learned model, images depicting wheeled vehicles having wheels turned to the left may be labeled according to the left wheel direction 304, images depicting wheeled vehicles having unturned wheels may be labeled according to the straight wheel direction 306, and images depicting wheeled vehicles having wheels turned to the right may be labeled according to the right wheel direction 308. The supervised machine-learned model may output values corresponding to the respective directions, for instance a discretized value of −1 for a wheeled vehicle classified as having wheels turned to the left, a discretized value of 0 for a wheeled vehicle classified as having unturned wheels, and a discretized value of 1 for a wheeled vehicle having wheels turned to the right.

Further, the first classification group 302 may then be used by the machine-learned model to classify wheel directions of wheeled vehicles depicted in input images into the three directions 304, 306, and 308 according to the techniques described herein. In some cases, a machine-learned model may be configured to output estimated trajectories of wheeled vehicles based on wheel direction. In some examples, the estimated trajectory may include a speed and/or a direction of travel of a wheeled vehicle. For instance, the machine-learned model may output an estimated trajectory 310 of a wheeled vehicle turning left based on classifying the wheeled vehicle into the left wheel direction 304, may output an estimated trajectory 312 of a wheeled vehicle proceeding straight based on classifying the wheeled vehicle into the straight wheel direction 306, and may output an estimated trajectory 314 of a wheeled vehicle turning right based on classifying the wheeled vehicle into the right wheel direction 308.

A second classification group 316 includes five bins corresponding to a left wheel direction 318, a slight left wheel direction 320, a straight wheel direction 322, a slight right wheel direction 324, and a right wheel direction 326. In some examples, the five wheel directions 318, 320, 322, 324, and 326 may correspond to discretized values ranging from −1 to 1, where the left wheel direction 318 corresponds to −1, the slight left wheel direction 320 corresponds to −0.5, the straight wheel direction 322 corresponds to 0, the slight right wheel direction 324 corresponds to 0.5, and the right wheel direction 326 corresponds to 1. The second classification group 316 may also be used to train a machine-learned model to classify wheel directions. However, unlike the first classification group 320, the second classification group 316 classifies into the five directions (or bins) 318, 320, 322, 324, and 326. In a supervised machine-learned model, images depicting wheeled vehicles having wheels turned more sharply to the left may be labeled according to the left wheel direction 318, while images depicting wheeled vehicles having wheels turned slightly left may be labeled according to the slight left wheel direction 320. Images depicting wheeled vehicles having unturned wheels may be labeled as having the straight wheel direction 322, similar to the straight wheel direction 306. Images depicting wheeled vehicles having wheels turned slightly to the right may be labeled according to the slight right wheel direction 324, while images depicting wheeled vehicles having wheels turned more sharply to the right may be labeled according to the right wheel direction 326. The supervised machine-learned model may output discretized values corresponding to the respective directions, for instance a discretized value of −1 for a wheeled vehicle classified as having wheels turned to the left, a discretized value of −0.5 for a wheeled vehicle classified as having wheels turned slightly left, a discretized value of 0 for a wheeled vehicle classified as having unturned wheels, a discretized value of 0.5 for a wheeled vehicle having wheels turned slightly right, and a discretized value of 1 for a wheeled vehicle having wheels turned to the right.

Additionally, the second classification group 316 may then be used by the machine-learned model to classify wheel directions of wheeled vehicles depicted in input images into the five directions 318, 320, 322, 324, and 326 according to the techniques described herein. Similar to the discussion above, a machine-learned model may be configured to output estimated trajectories of wheeled vehicles based on wheel direction. For instance, the machine-learned model may output an estimated trajectory 328 of a wheeled vehicle making a sharp left turn based on classifying the wheeled vehicle into the left wheel direction 318, and may output an estimated trajectory 330 of a wheeled vehicle moving slightly left (e.g., exiting a highway on an off-ramp) based on classifying the wheeled vehicle into the slight left wheel direction 320. Similar to the discussion above, the machine-learned model may output an estimated trajectory 332 of a wheeled vehicle proceeding straight based on classifying the wheeled vehicle into the straight wheel direction 322. Further, the machine-learned model may output an estimated trajectory 334 of a wheeled vehicle moving slightly right based on classifying the wheeled vehicle into the slight right wheel direction 324, and may output an estimated trajectory 336 of a wheeled vehicle turning more sharply to the right based on classifying the wheeled vehicle into the right wheel direction 326.

While the first classification group 302 and the second classification group 316 provide three and five bins, respectively, of different possible wheel directions that may be used to train and implement a machine-learned model, examples are contemplated in which a machine-learned model has more (e.g., 7, 9, 10, 20, 180) or less (e.g., 2) classifications or bins in a group. Further, though not depicted in FIG. 3, a similar training method can be used for regressing the wheel angle. In such examples, labeled images of wheels may be provided with associated wheel angles from −1 to 1 (from left to right). Example images of turned wheels may be used to determine a continuous output indicative of the steering angle.

Figure 4:
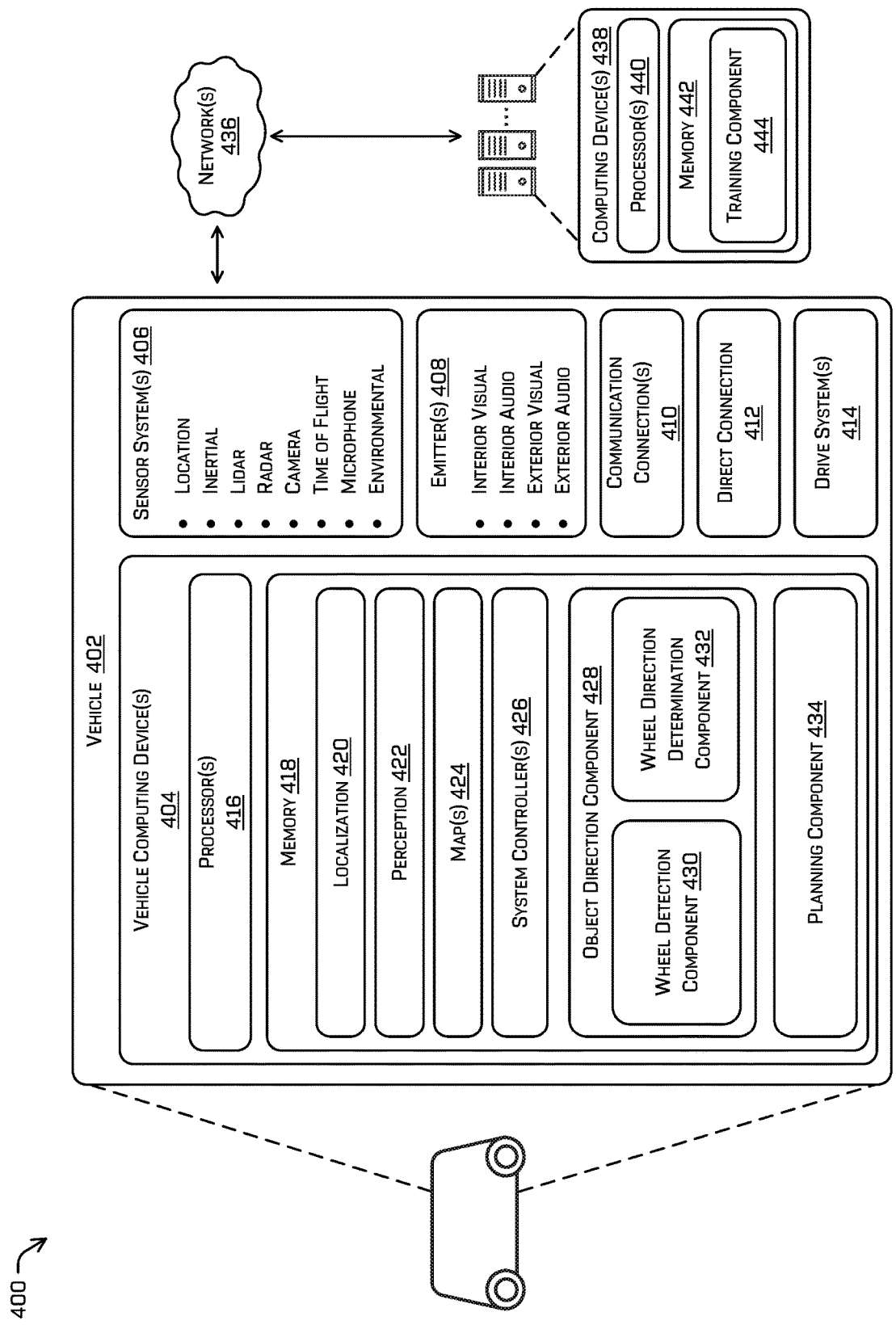
FIG. 4 depicts a block diagram of an example system for implementing the techniques described herein.

FIG. 4 depicts a block diagram of an example system 400 for implementing the techniques described herein. In at least one example, the system 400 can include a vehicle 402, such as an autonomous, semi-autonomous, or manually controlled vehicle.

The vehicle 402 can include vehicle computing device(s) 404, one or more sensor systems 406, one or more emitters 408, one or more communication connections 410, at least one direct connection 412, and one or more drive systems 414.

The vehicle computing device(s) 404 can include one or more processors 416 and memory 418 communicatively coupled with the one or more processors 416. In the illustrated example, the vehicle 402 is an autonomous vehicle; however, the vehicle 402 could be any other type of vehicle or robotic platform. In the illustrated example, the memory 418 of the vehicle computing device(s) 404 stores a localization component 420, a perception component 422, one or more maps 424, one or more system controllers 426, an object direction component 428, a wheel detection component 430, a wheel direction determination component 432, and a planning component 434. Though depicted in FIG. 4 as residing in the memory 418 for illustrative purposes, it is contemplated that the localization component 420, the perception component 422, the one or more maps 424, the one or more system controllers 426, the object direction component 428, the wheel detection component 430, the wheel direction determination component 432, and the planning component 434 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory, for determining to retrieve map data, and so forth, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, wheel, pedestrian, cyclist, animal, building, tree, road surface, curb, sidewalk, stoplight, stop sign, lane marker, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 422 performs detection, the perception component 422 may output detections of wheeled vehicles and/or associated wheels detected in the image. Such detections may comprise two-dimensional bounding boxes (which may subsequently be used to crop the image) and/or masks of the detected object. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system 406. Alternatively or additionally, detection may utilize a deep learning approach based on a convolutional neural network (CNN) to classify objects depicted in images received from a camera of the sensor system 406. In examples, the detection may utilize one or more of the object detection techniques (or others) to detect a wheeled vehicle depicted in an image, detect a wheel of the wheeled vehicle depicted in an image, and/or detect a wheel that controls steering of a wheeled vehicle depicted in an image, according to the described techniques. The memory 418 can further include one or more maps 424 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 424 can include at least one map (e.g., images and/or a mesh). In some examples, the vehicle 402 can be controlled based at least in part on the maps 424. That is, the maps 424 can be used in connection with the localization component 420, the perception component 422, the object direction component 428, or the planning component 434 to determine a location of the vehicle 402, identify objects in an environment, and/or generate routes and/or trajectories to navigate within an environment.

In some examples, the one or more maps 424 can be stored on a remote computing device(s) (such as the computing device(s) 438) accessible via network(s) 436. In some examples, multiple maps 424 can be stored based on, for example, a characteristic (e.g., type of entity, time of day, day of week, season of the year, etc.). Storing multiple maps 424 can have similar memory requirements, but increase the speed at which data in a map can be accessed. In some examples, the one or more maps 424 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well.

In general, the object direction component 428 can estimate a trajectory of an object based on data provided by the sensor system(s) 406. In some instances, the object direction component 428 can provide information generated by the wheel detection component 430 and/or the wheel direction determination component 432 to the planning component 434 to determine when and/or how to control the vehicle 402 to traverse an environment. As discussed herein, the object direction component 428 can receive image data, map data, lidar data, and the like to determine information about objects in an environment.

The wheel direction determination component 432 can determine, from a wheel detected in an image of a wheeled vehicle, a classification of a direction and/or an angle of the wheel. For example, the wheel direction determination component 432 may utilize a machine-learned model trained to classify wheel directions of wheeled vehicles into three categories (e.g., left, straight, right), five categories (e.g., left, slight left, straight, slight right, right), or more categories (e.g., based on degrees or degree ranges). In some examples, the wheel direction determination component 432 may regress a wheel angle. Further, the wheel direction determination component 432 may refine the parameters of the machine-learned model to more accurately classify wheel directions by comparing a difference in a direction prediction provided by the machine-learned model to measured directions of travel of wheeled vehicles (e.g., as captured by one or more sensors of the sensor system 406). In some cases, the wheel direction determination component 432 may utilize the machine-learned model to provide estimated trajectories associated with the wheel directions of wheeled vehicles as well. In some examples, the wheel direction determination component 432 can provide information regarding the wheel direction and/or the estimated trajectory of the wheeled vehicle to the planning component 434 to use in controlling the vehicle 402.

In general, the planning component 434 can determine a path for the vehicle 402 to follow to traverse the environment. For example, the planning component 434 can determine various routes and trajectories and various levels of detail. For example, the planning component 434 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 434 can generate an instruction for guiding the autonomous vehicle along at least a portion of the route from the first location to the second location. In at least one example, the planning component 434 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In some instances, the planning component 434 can generate one or more trajectories for the vehicle 402 based at least in part on estimated trajectories of wheeled vehicles in the environment as determined from classified wheel directions of the wheeled vehicles, as discussed herein. In some examples, the planning component 434 can use temporal logic, such as linear temporal logic and/or signal temporal logic, to evaluate one or more trajectories of the vehicle 402.

In at least one example, the vehicle computing device(s) 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

As can be understood, the components discussed herein (e.g., the localization component 420, the perception component 422, the one or more maps 424, the one or more system controllers 426, the object direction component 428, the wheel detection component 430, the wheel direction determination component 432, and the planning component 434) are described as divided for illustrative purposes. However, the operations performed by the various components can be combined or performed in any other component. By way of example, functions described in relation to the object direction component 428, the wheel detection component 430, and/or the wheel direction determination component 432 may be performed by the perception component 422 to reduce the amount of data transferred by the system.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404. Additionally or alternatively, the sensor system(s) 406 can send sensor data, via the one or more networks 436, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 4G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the one or more maps 424, the one or more system controllers 426, the object direction component 428, the wheel detection component 430, the wheel direction determination component 432, and the planning component 434 can process sensor data, as described above, and can send their respective outputs, over the one or more network(s) 436, to one or more computing device(s) 438. In at least one example, the localization component 420, the perception component 422, the one or more maps 424, the one or more system controllers 426, the object direction component 428, the wheel direction component 430, the wheel direction determination component 432, and the planning component 434 can send their respective outputs to the one or more computing device(s) 438 at a particular frequency, after a lapse of a predetermined period of time, in near real-time, etc.

In some examples, the vehicle 402 can send sensor data to one or more computing device(s) 438 via the network(s) 436. In some examples, the vehicle 402 can send raw sensor data to the computing device(s) 438. In other examples, the vehicle 402 can send processed sensor data and/or representations of sensor data to the computing device(s) 438. In some examples, the vehicle 402 can send sensor data to the computing device(s) 438 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and a memory 442 storing a training component 444.

In some instances, the training component 444 can include functionality to train one or more models to detect wheeled vehicles, detect wheels of wheeled vehicles, detect wheels that control steering of wheeled vehicles, determine (classify or regress) directions of wheels of wheeled vehicles, determine estimated trajectories based on classified directions of wheeled vehicles, and the like. In some instances, the training component 444 can communicate information generated by the one or more models to the vehicle computing device(s) 404 to revise how to control the vehicle 402 in response to different situations.

For instance, aspects of some or all of the components discussed herein can include any models, algorithms, and/or machine learning algorithms. For example, in some instances, the components in the memory 442 (and the memory 418, discussed above) can be implemented as a neural network. In some examples, the training component 444 can utilize a neural network to generate and/or execute one or more models to improve various aspects of object trajectory estimation for use in trajectory planning of the vehicle 402.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa. Further, aspects of the object direction component 428 and/or the planning component 434 can be performed on any of the devices discussed herein.

Figure 5:
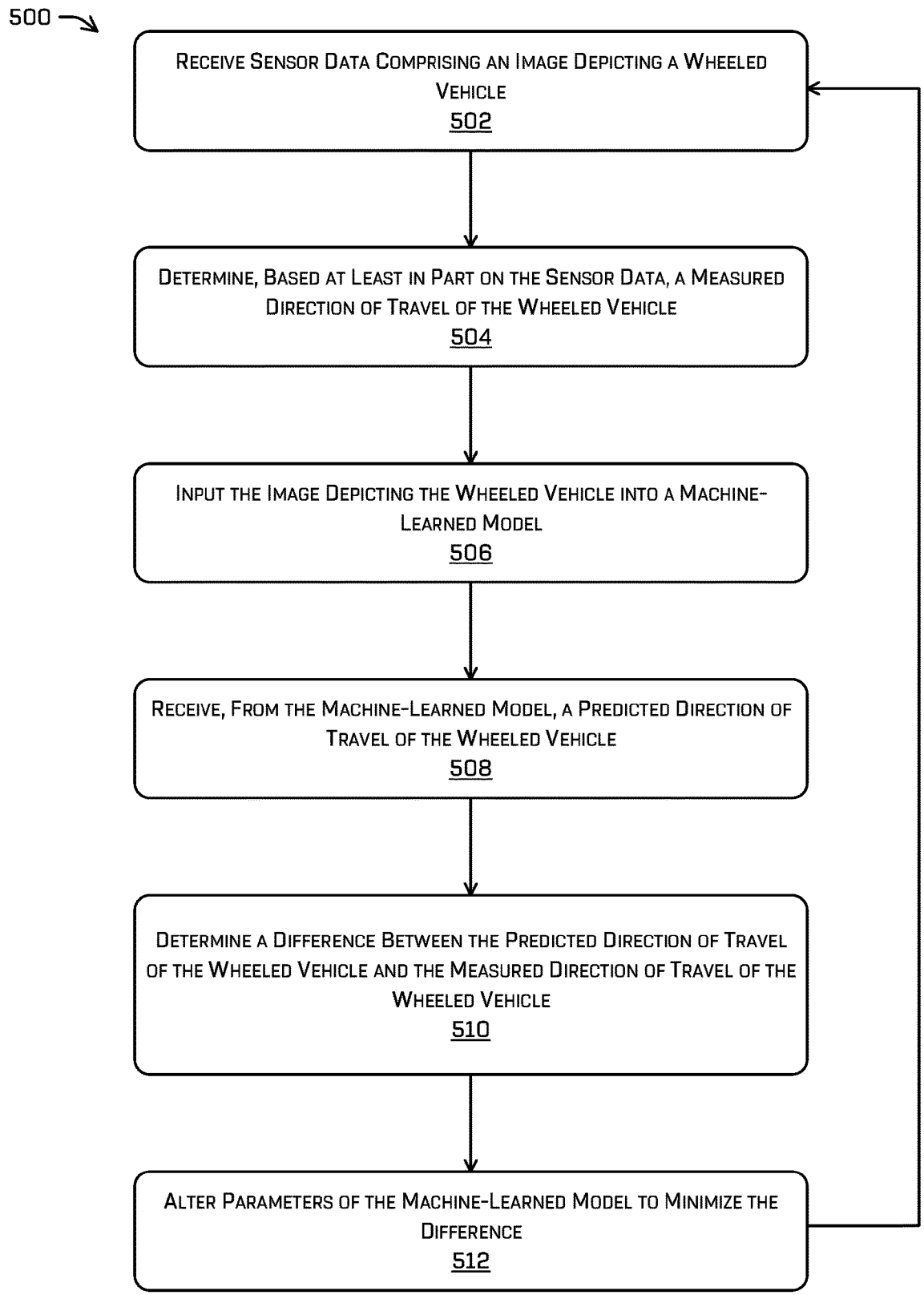
FIG. 5 depicts an example process for training a machine-learned model by determining a measured direction of travel of a wheeled vehicle, inputting an image depicting the wheeled vehicle into the machine-learned model, receiving a predicted direction of travel of the wheeled vehicle from the machine-learned model, and altering parameters of the machine-learned model based on differences between the measured direction and the predicted direction, in accordance with examples of the disclosure.

FIG. 5 depicts an example process 500 for determining a wheel direction of a wheeled vehicle, then inputting an image depicting the wheeled vehicle into a machine-learned model, receiving a predicted direction of travel of the wheeled vehicle from the machine-learned model, and altering parameters of the machine-learned model based on differences between the measured direction and the predicted direction, in accordance with examples of the disclosure. For example, some or all of the process 500 can be performed by one or more components in FIG. 4, as described herein. For example, some or all of the process 500 can be performed by the vehicle computing device(s) 404, the computing device(s) 438, or any other computing device or combination of computing devices. Further, any of the operations described in the example process 500 may be executed in parallel, in a different order than depicted in the process 500, omitted, combined with the process 600, combined with other processes, and the like.

At operation 502, the process can include receiving sensor data comprising an image depicting a wheeled vehicle. For example, the sensor data may have been captured by a camera included as a sensor on an autonomous vehicle as it traversed an environment. The camera may have captured images of the surrounding environment as the autonomous vehicle traversed the environment. In some cases, the sensor data may be received from log data comprising previously generated sensor data.

At operation 504, the process can include determining, based at least in part on the sensor data, a measured direction of travel of the wheeled vehicle. In some examples, the sensor data may include multiple images (including or in addition to the image described in operation 502) that depict a trajectory that the wheeled vehicle followed over time. In such examples, a track (or path) of the detected vehicle and/or parameters associated with the vehicle (body length, body width, velocity, and the like) may be used to determine the steering angle. In at least some examples, multiple images depicting wheeled vehicles may be annotated based on multiple classifications or with designated angles. Alternatively or additionally, the sensor data may use data collected using other sensor modalities to determine the measured direction of travel of the wheeled vehicle, such as lidar, radar, TOF, and the like. In some examples in which the sensor data is received from log data, determining the measured direction of travel may comprise receiving a portion of the log data associated with a time the image was taken and determining the measured direction from the log data. In one example, determining the measured direction of travel of a wheeled vehicle may include determining a first portion of log data generated after the image was captured, and determining a second portion of the log data generated substantially simultaneously with an image of the wheeled vehicle. Then, the measured direction may be determined by comparing the first portion of the log data with the second portion of the log data. For instance, the comparison may include comparing a distance between a first position in the first portion of the log data and a second position of the second portion of the log data, comparing a first trajectory of the first portion of the log data with a second trajectory of the second portion of the log data, determining a curvature between a first position in the first portion of the log data and a second position in the second portion of the log data, and comparing a first velocity in a first portion of the log data and a second velocity of a second portion of the log data, to name a few examples.

At operation 506, the process can include inputting the image depicting the wheeled vehicle into a machine-learned model. In some examples, the machine-learned model is a supervised model, in which the model is trained using labeled training examples to generate an inferred function to map new, unlabeled examples. Alternatively or additionally, the machine-learned model trained to classify wheel directions may be an unsupervised model, which may identify commonalities in an input data set and may react based on the presence or absence of such commonalities in each new piece of data. In some such examples, various clustering algorithms (such as k-means) may be used to determine clusters of wheel angles. As an example, where three clusters are selected, such an unsupervised model may output clusters corresponding to roughly left, right, and straight.

In some cases, a dense connected convolutional neural network may be used, which may simplify the connectivity pattern between layers of the architecture. The architecture may be trained as a softmax classifier (over a number of classification) using a cross-entropy loss to predict discrete wheel orientations. In those examples in which the machine-learned model is a regression model, a heteroscedastic loss model may be used to predict a continuous range of wheel orientations, where wheel directions of wheeled vehicles fall within the continuous range.

According to some examples, the machine-learned model may be trained using training data generated based on historical sensor data (and/or previously generated output based on such historical data) from one or more perception logs or other sources of historical sensor data. The training data may be generated by associating log data such as historical image data (e.g., based on other historical sensor data) indicating the actual measured direction of travel of a wheeled vehicle depicted in the image over time. The log data may include or be based at least in part on historical sensor data such as lidar data, radar data, TOF data, or combinations of these or other sensor modalities. The log data may include track data describing the tracks of one or more objects and/or wheeled vehicles sensed in the environment of the autonomous vehicle. In some examples, the track data may indicate a yaw, a trajectory, or the like, which may be used to determine a measured direction of travel of a wheeled vehicle. For instance, an image depicting wheeled vehicle turned to the left can be labeled with an actual measured speed, yaw, yaw rate, and/or trajectory of the wheeled vehicle at the time the image was captured (e.g., as may be provided by the tracking information, radar returns, or the like associated with the wheeled vehicle depicted in the image) and/or at a time following the time at which the image was captured. In at least some examples, tracks may comprise historical sequences of any one or more of positions, velocities, accelerations, yaw (and/or steering angle), yaw rates, and the like associated with an object. In at least some examples, multiple points of a track may be used to determine the wheel angle (e.g., by determining the necessary wheel angle based on vehicle extents (e.g., an estimated width which can be used to assume a wheel base) and/or curvature between subsequent points). This labeling can be performed for some or all of the images depicting objects to generate training data which can be used to train a neural network or other machine learned model, as described elsewhere herein. Based on this training data, the machine-learned model may be trained to detect and/or predict wheel directions of wheeled vehicles, along with predicting trajectories associated with said predicted wheel directions, based on the directions of wheels of wheeled vehicles as captured in an image.

At operation 508, the process can include receiving, from the machine-learned model, a predicted direction of travel of the wheeled vehicle. The predicted direction of travel may be output as an indication of a wheel direction, e.g., a discretized value between −1 and 1, where −1 corresponds to wheels that are turned left, 0 corresponds to straight wheels, and 1 corresponds to wheels that are turned right. Of course, any numeric values may be assigned to wheel directions without departing from the scope of the disclosure. In those examples in which the wheel angle is regressed, an angle may be output (e.g., a continuous value ranging between −1 and 1 may be output for wheel orientations from left to right, for example). In some examples, the predicted direction of travel may correspond to an estimated trajectory of the wheeled vehicle, which may take into account a speed of the wheeled vehicle, whether the wheeled vehicle is traveling forward or backward, possible routes that the wheeled vehicle may take (e.g., based on map data of the environment), and so forth.

At operation 510, the process can include determining a difference between the predicted direction of travel of the wheeled vehicle and the measured direction of travel of the wheeled vehicle (e.g., the "ground truth"). Consider an example where three possible classifications may be output from the machine-learned model, left (−1), straight (0) and right (1). The machine-learned model may output one of these three classifications, for instance left or −1. If the measured direction of travel is the same as the output of the machine-learned model, e.g., the wheeled vehicle made a left turn corresponding to the −1 value, then the difference may be zero. However, if the measured direction of travel is different from the output of the machine-learned model, e.g., the wheeled vehicle continued on a straight path, then the difference may be represented by the difference between the machine-learned model output (−1) and the ground truth direction (0), e.g., a difference of +1. Of course, any number of classifications may be used as described elsewhere herein, and any suitable technique for representing a difference between the output of the machine-learned model and the true, measured direction may also be used without departing from the scope of the disclosure. As above, such a difference may comprise determining a cross-entropy loss, a heteroscedastic loss, or the like.

At operation 512, the process can include altering the parameters of the machine-learned model to minimize (or optimize) the difference between the predicted direction of travel of the wheeled vehicle and the measured direction of travel of the wheeled vehicle (for example, by back-propagating the loss). By altering the parameters of the machine-learned model, to minimize the difference, the machine-learned model "learns" over time to accurately predict the directions associated with wheels of wheeled vehicles, along with trajectories of the wheeled vehicles that have corresponding wheel directions. In some examples, the process may return to operation 502, to continue receiving sensor data comprising images depicting wheeled vehicles, thus continuing to refine the machine-learned model to more accurately predict trajectories of wheeled vehicles based on wheels depicted in images. Alternatively or additionally, the machine-learned model may be transmitted to an autonomous vehicle for use in controlling the autonomous vehicle based on wheel directions of wheeled vehicles.

Figure 6:
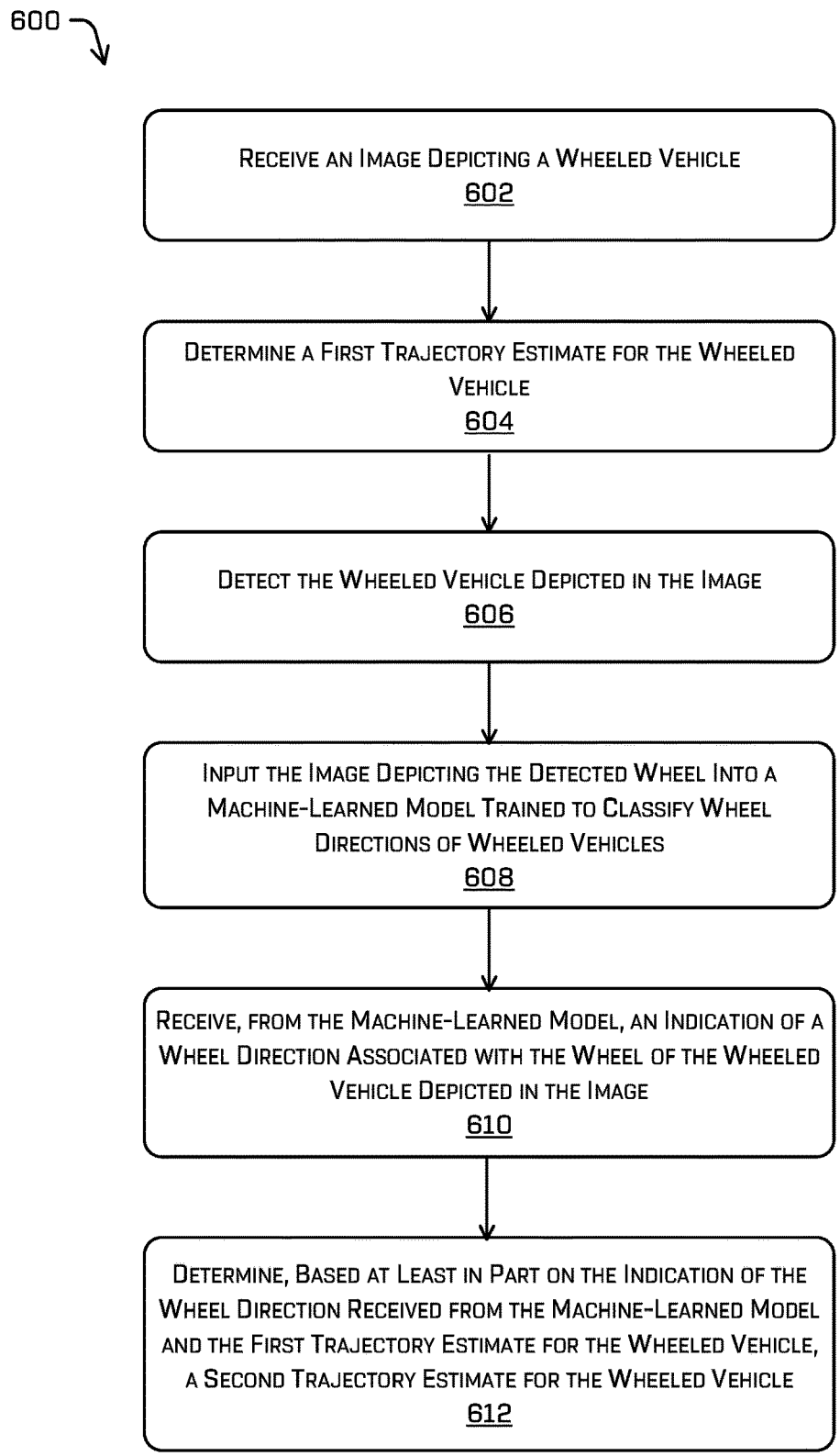
FIG. 6 depicts an example process for determining an initial trajectory estimate for a wheeled vehicle, inputting an image of the wheeled vehicle into a machine-learned model trained to determine wheel directions of wheeled vehicles, receiving a direction associated with the wheel from the machine-learned model, and determining a trajectory estimate of the wheeled vehicle based at least in part on the received direction, in accordance with examples of the disclosure.

FIG. 6 depicts an example process 600 for determining an initial trajectory estimate for a wheeled vehicle, inputting an image of the wheeled vehicle into a machine-learned model trained to determine wheel directions of wheeled vehicles, receiving a direction associated with the wheel from the machine-learned model, and determining a trajectory estimate of the wheeled vehicle based on the received direction, in accordance with examples of the disclosure. For example, some or all of the process 600 can be performed by one or more components in FIG. 4, as described herein. For example, some or all of the process 600 can be performed by the vehicle computing device(s) 404. Further, any of the operations described in the example process 600 may be executed in parallel, in a different order than depicted in the process 600, omit any of the operations of the depicted process 600, combined with the process 500, and the like.

At operation 602, the process can include receiving an image depicting a wheeled vehicle. As discussed above, a camera may be included as a sensor on an autonomous vehicle traversing an environment. The camera may capture images of the surrounding environment as the autonomous vehicle traverses the environment.

At operation 604, the process can include determining a first trajectory estimate for the wheeled vehicle. The first trajectory estimate may be based on data received from one or more sensors of the autonomous vehicle over time, for instance a sequence of images depicting the wheeled vehicle, lidar data depicting the wheeled vehicle, a map of the environment, and so forth. The first trajectory estimate may use data related to past observations of the wheeled vehicle to make a prediction of how the wheeled vehicle will proceed in the environment in the future.

At operation 606, the process can include detecting the wheeled vehicle depicted in the image. The detection may be by using any suitable object detection technique, such as a machine learning approach (e.g., scale-invariant feature transform (SIFT), histogram of oriented gradients (HOG), etc.) followed by a support vector machine (SVM) to classify the object, or a deep learning approach based on a convolutional neural network (CNN), to name a few examples.

At operation 608, the process can include inputting the image depicting the detected wheel into a machine-learned model trained to classify wheel directions of wheeled vehicles. In some examples, a DenseNet architecture may be trained as a softmax classifier and/or similar networks may be used to train a regression algorithm to determine an output, such as into a predetermined number of categories of wheel directions and/or a continuous wheel angle estimation, accordingly.

At operation 610, the process can include receiving, from the machine-learned model, an indication of a wheel direction associated with the wheel of the wheeled vehicle depicted in the image. In some examples, an indication of a wheel direction (e.g., a discretized value of −1, 0, or 1 and/or a continuous value (which may be from −1 to 1)) may be output, and additional systems of the autonomous vehicle may combine the wheel direction with other data related to the wheeled vehicle and/or the environment to predict a trajectory of the wheeled vehicle. However, in some cases, the machine-learned model may output a predicted trajectory of the wheeled vehicle based on a classification of the wheel direction.

At operation 612, the process can include determining, based at least in part on the indication of the wheel direction received from the machine-learned model and the first trajectory estimate for the wheeled vehicle, a second trajectory estimate for the wheeled vehicle. In at least some examples, a speed of the vehicle and the wheel angle determined may be used to constrain a yaw rate of the vehicle. In other words, the indication of the wheel direction may be used to refine trajectory estimates generated by other systems or components of an autonomous vehicle, increasing the accuracy of these predictions and consequently increasing safety of passengers within the autonomous vehicle and those in the surrounding environment.

Example Clauses

A: A method comprising: receiving sensor data captured by one or more sensors, the sensor data comprising image data; detecting, based at least in part on the image data, an object in an environment of the one or more sensors; determining, based at least in part on the sensor data, a measured direction of travel of the object; inputting, into a machine-learned model, the image data; receiving, from the first machine-learned model, a predicted wheel direction of the object; determining a difference between the predicted wheel direction of the object and the measured direction of travel of the object; and altering one or more parameters of the machine-learned model to minimize the difference.

B: The method of paragraph A, and wherein determining the measured direction of travel of the object is based at least in part on log data.

C: The method of paragraph B, wherein the log data comprises track information of the object, the track information comprising one or more of object positions, object velocities, object accelerations, or object yaw rates.

D: The method of any one of paragraphs A-C, further comprising transmitting the machine-learned model to an autonomous vehicle for use in controlling the autonomous vehicle based on wheel directions of wheeled vehicles.

E: The method of any one of paragraphs A-D, wherein: the machine-learned model is trained to classify wheel directions of wheeled vehicles into a classification; and the predicted wheel direction of the object is determined based at least in part on the classification.

F: The method of paragraph E, wherein the classification is included in a classification group, the classification group including at least a left direction classification, a straight direction classification, and a right direction classification.

G: A system comprising: one or more processors; and one or more computer-readable storage media storing instructions which, when executed by the one or more processors, perform operations comprising: determining, based at least in part on sensor data from one or more sensors, a measured direction of travel of a wheeled vehicle in an environment; receiving an image depicting the wheeled vehicle in the environment; inputting at least a portion of the image depicting the wheeled vehicle into a machine-learned model; receiving, from the machine-learned model, a predicted wheel direction of the wheeled vehicle; determining a difference between the predicted wheel direction and the measured direction of travel of the wheeled vehicle; and altering one or more parameters of the machine-learned model to minimize the difference.

H: The system of paragraph G, wherein the sensor data is received from log data which comprises previously generated sensor data, and wherein determining the measured direction of travel comprises: receiving, a portion of the log data associated with a time the image was taken; and determining, from the log data, the measured direction.

I: The system of paragraph H, wherein the log data comprises tracking information associated with the object at a time the image was captured, and wherein the measured direction is determined based at least in part on a yaw indicated by the tracking information or a trajectory indicated by the tracking information.

J: The system of either paragraph H or I, wherein the log data comprises multiple positions associated with the object, and wherein determining the measured direction comprises: determining a first portion of the log data generated after the image was captured; determining a second portion of the log data generated substantially simultaneously with the image; and comparing the first portion with the second portion.

K: The system of paragraph J, wherein comparing the first portion and the second portion comprises one or more of: comparing a distance between a first position of the first portion and a second position of the second portion; comparing a first trajectory of the first portion with a second trajectory of the second portion; determining a curvature between the first position and the second position; or comparing a first velocity of the first portion with a second velocity of the second portion.

L: The system of any one of paragraphs G-K, wherein the machine-learned model is a classifier for classifying the wheel directions of the wheeled vehicles into at least three different directions.

M: The system of paragraph L, wherein the classifier is trained as a softmax classifier for classifying using cross-entropy loss to predict discrete wheel orientations.

N: The system of any one of paragraphs G-M, wherein the machine-learned model is a regression model to determine predicted angles of the wheel directions of wheeled vehicles.

O: The system of paragraph N, wherein the regression model is trained using a heteroscedastic loss, an output of the machine learned model comprising a continuous range of wheel orientations, and wherein the predicted angles of the wheel directions of the wheeled vehicles fall within the continuous range.

P: One or more non-transitory computer-readable media storing instructions which, when executed by one or more processors, perform operations comprising: receiving log data, the log data comprising an image depicting a wheeled vehicle in an environment and one or more of track information, position information, or trajectory information associated with the wheeled vehicle; determining, based at least in part on the log data, a measured direction of the wheeled vehicle; inputting at least a portion of the image depicting the wheeled vehicle into a machine-learned model; receiving, from the first machine-learned model, a predicted wheel direction of the wheeled vehicle; determining a difference between the predicted wheel direction and the measured direction of travel of the wheeled vehicle; and altering one or more parameters of the machine-learned model to optimize the difference.

Q: The one or more computer-readable media of paragraph P, wherein the first machine-learned model is a classifier for classifying the wheel directions of the wheeled vehicles as one of multiple different directions.

R: The one or more computer-readable media of paragraph Q, wherein the classifier is trained as a softmax classifier for classifying over the multiple directions using cross-entropy loss to predict discrete wheel orientations.

S: The one or more computer-readable media of any one of paragraphs P-R, wherein the first machine-learned model is a regression model to determine predicted angles of the wheel directions of wheeled vehicles.

T: The one or more computer-readable media of paragraph S, wherein the regression model is trained based at least in part on a heteroscedastic loss, an output of the machine learned model comprising a continuous range of wheel orientations.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
    receiving sensor data captured by one or more sensors at one or more processors communicatively coupled to the one or more sensors, the sensor data comprising image data;
    detecting, based at least in part on the image data, an object in an environment of the one or more sensors;
    determining, by the one or more processors and based at least in part on the sensor data, a measured direction of travel of the object;
    inputting, into a machine-learned model, the image data;
    receiving, from the machine-learned model, a predicted wheel direction of the object;
    determining, by the one or more processors, a difference between the predicted wheel direction of the object and the measured direction of travel of the object; and
    altering, by the one or more processors, one or more parameters of the machine-learned model to minimize the difference.

2. The method of claim 1, and wherein determining the measured direction of travel of the object is based at least in part on log data.

3. The method of claim 2, wherein the log data comprises track information of the object, the track information comprising one or more of object positions, object velocities, object accelerations, or object yaw rates.

4. The method of claim 1, further comprising transmitting the machine-learned model to an autonomous vehicle for use in controlling the autonomous vehicle based on wheel directions of wheeled vehicles.

5. The method of claim 1, wherein:
the machine-learned model is trained to classify wheel directions of wheeled vehicles into a classification; and
the predicted wheel direction of the object is determined based at least in part on the classification.

6. The method of claim 5, wherein the classification is included in a classification group, the classification group including at least a left direction classification, a straight direction classification, and a right direction classification.

7. A system comprising:
one or more processors; and
one or more computer-readable storage media storing instructions which, when executed by the one or more processors, perform operations comprising:
determining, based at least in part on sensor data from one or more sensors, a measured direction of travel of a wheeled vehicle in an environment;
receiving an image depicting the wheeled vehicle in the environment;
inputting at least a portion of the image depicting the wheeled vehicle into a machine-learned model;
receiving, from the machine-learned model, a predicted wheel direction of the wheeled vehicle;
determining a difference between the predicted wheel direction and the measured direction of travel of the wheeled vehicle; and
altering one or more parameters of the machine-learned model to minimize the difference.

8. The system of claim 7, wherein the sensor data is received from log data which comprises previously generated sensor data, and
wherein determining the measured direction of travel comprises:
receiving a portion of the log data associated with a time the image was taken; and
determining, from the log data, the measured direction.

9. The system of claim 8, wherein the log data comprises tracking information associated with the wheeled vehicle at a time the image was captured, and
wherein the measured direction is determined based at least in part on a yaw indicated by the tracking information or a trajectory indicated by the tracking information.

10. The system of claim 8, wherein the log data comprises multiple positions associated with the wheeled vehicle, and
wherein determining the measured direction comprises:
determining a first portion of the log data generated after the image was captured;
determining a second portion of the log data generated substantially simultaneously with the image; and
comparing the first portion with the second portion.

11. The system of claim 10, wherein comparing the first portion and the second portion comprises one or more of:
comparing a distance between a first position of the first portion and a second position of the second portion;
comparing a first trajectory of the first portion with a second trajectory of the second portion;
determining a curvature between the first position and the second position; or
comparing a first velocity of the first portion with a second velocity of the second portion.

12. The system of claim 7, wherein the machine-learned model is a classifier for classifying the wheel directions of the wheeled vehicles into at least three different directions.

13. The system of claim 12, wherein the classifier is trained as a softmax classifier for classifying using cross-entropy loss to predict discrete wheel orientations.

14. The system of claim 7, wherein the machine-learned model is a regression model to determine predicted angles of the wheel directions of wheeled vehicles.

15. The system of claim 14, wherein the regression model is trained using a heteroscedastic loss, an output of the machine-learned model comprising a continuous range of wheel orientations, and wherein the predicted angles of the wheel directions of the wheeled vehicles fall within the continuous range.

16. One or more non-transitory computer-readable media storing instructions which, when executed by one or more processors, perform operations comprising:
receiving log data, the log data comprising an image depicting a wheeled vehicle in an environment and one or more of track information, position information, or trajectory information associated with the wheeled vehicle;
determining, based at least in part on the log data, a measured direction of travel of the wheeled vehicle;
inputting at least a portion of the image depicting the wheeled vehicle into a machine-learned model;
receiving, from the machine-learned model, a predicted wheel direction of the wheeled vehicle;
determining a difference between the predicted wheel direction and the measured direction of travel of the wheeled vehicle; and
altering one or more parameters of the machine-learned model to optimize the difference.

17. The one or more computer-readable media of claim 16, wherein the machine-learned model is a classifier for classifying the wheel directions of the wheeled vehicles as one of multiple different directions.

18. The one or more computer-readable media of claim 17, wherein the classifier is trained as a softmax classifier for classifying over the multiple different directions using cross-entropy loss to predict discrete wheel orientations.

19. The one or more computer-readable media of claim 16, wherein the machine-learned model is a regression model to determine predicted angles of the wheel directions of wheeled vehicles.

20. The one or more computer-readable media of claim 19, wherein the regression model is trained based at least in part on a heteroscedastic loss, an output of the machine-learned model comprising a continuous range of wheel orientations.

* * * * *